(12) United States Patent
Lyngholm et al.

(10) Patent No.: US 11,402,974 B2
(45) Date of Patent: Aug. 2, 2022

(54) USER INTERFACE SYSTEM AND METHOD

(71) Applicant: Sensae ApS, Copenhagen (DK)

(72) Inventors: Daniel Lyngholm, London (GB); Liviu Babitz, London (GB); Alexander Nedergaard, Copenhagen (DK); Olivier de Simone, London (GB)

(73) Assignee: Sensae ApS, Copenhagen (DK)

( * ) Notice: Subject to any disclaimer, the term of this patent is extended or adjusted under 35 U.S.C. 154(b) by 0 days.

(21) Appl. No.: 16/881,975

(22) Filed: May 22, 2020

(65) Prior Publication Data

US 2020/0371652 A1 Nov. 26, 2020

Related U.S. Application Data

(60) Provisional application No. 62/870,449, filed on Jul. 3, 2019.

(30) Foreign Application Priority Data

May 24, 2019 (GB) ...................................... 1907385
Oct. 24, 2019 (GB) ...................................... 1915435

(51) Int. Cl.
*G06F 3/048* (2013.01)
*G06F 3/0484* (2022.01)
(Continued)

(52) U.S. Cl.
CPC ............ *G06F 3/0484* (2013.01); *G06F 3/016* (2013.01); *G06F 3/162* (2013.01)

(58) Field of Classification Search
CPC ...... G06F 3/0484; G06F 3/0482; G06F 3/016; G06F 3/162; G06F 3/0488
See application file for complete search history.

(56) References Cited

U.S. PATENT DOCUMENTS 6,449,496 B1 * 9/2002 Beith .................... H04M 1/271
379/88.04
9,891,884 B1 * 2/2018 Baughman .............. G06F 3/165
(Continued)

FOREIGN PATENT DOCUMENTS

EP 2778843 A2 9/2014

OTHER PUBLICATIONS

Maclean et al., Do it Yourself Haptics Part II; 2008; IEEE; 16 pages.*
(Continued)

*Primary Examiner* — Linh K Pham
(74) *Attorney, Agent, or Firm* — Thomas | Horstemeyer, LLP

(57) ABSTRACT

A user interface system and method are disclosed. The system comprises a controller, a data repository and an I/O unit. The user interface system is configured to cause, via the I/O unit, a user interface device of a user to provide a stimulus to the user, the user interface system is further configured to receive, from the user, data on the stimulus. In response to the stimulus and the data provided by the user on the stimulus, the user interface system is arranged to record, in the data repository, stimulus recognized by the user. The controller is operable to determine an optimized set of stimuli to be used by the user interface device in dependence on the stimuli recognized by the user, the optimized set matching the number of stimuli provided by the user interface device. The controller being arranged to communicate with the user interface device and configure the user interface device to use the optimized set of stimuli for its functions.

13 Claims, 12 Drawing Sheets

Accuracy and latency of identifying specific clusters of rhythms

(51) Int. Cl.
  *G06F 3/01* (2006.01)
  *G06F 3/16* (2006.01)

(56) References Cited

U.S. PATENT DOCUMENTS

| | | | |
|---|---|---|---|
| 2010/0009719 A1* | 1/2010 | Oh .................. | H04N 7/141 |
| | | | 455/563 |
| 2014/0057232 A1* | 2/2014 | Wetmore ............ | G09B 19/00 |
| | | | 600/28 |
| 2017/0111510 A1* | 4/2017 | Cardona ........... | H04M 3/42348 |
| 2017/0168773 A1 | 6/2017 | Keller et al. | |
| 2018/0173311 A1 | 6/2018 | Saboune et al. | |
| 2019/0025921 A1* | 1/2019 | Hwang ............. | G02B 27/0172 |
| 2019/0265798 A1* | 8/2019 | Nakagawa .......... | G06F 3/0488 |

OTHER PUBLICATIONS

Souza et al., The Effects of Physiologically-adaptive Virtual Environment on User's Sense of Presence; 2018; IEEE; 10 pages.*
European Search Report dated Mar. 22, 2022 for European Patent Application No. 20275096.4.

* cited by examiner

Fig. 4
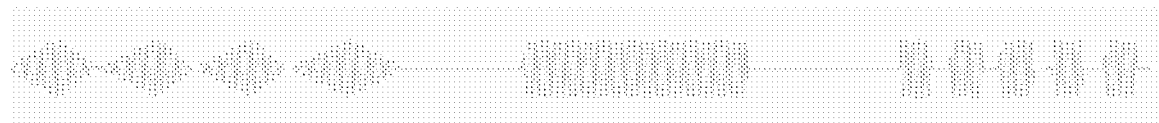
Figure 5a: Detection threshold /amplitude threshold
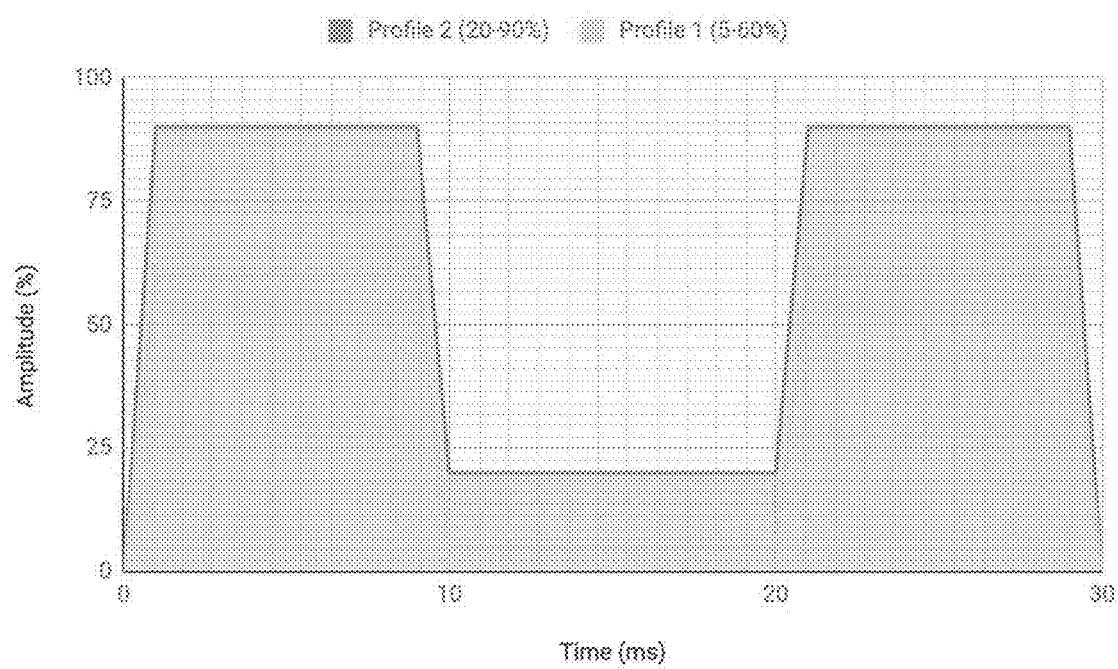
Fig. 5b Profile 1 (low amplitude threshold & preference)
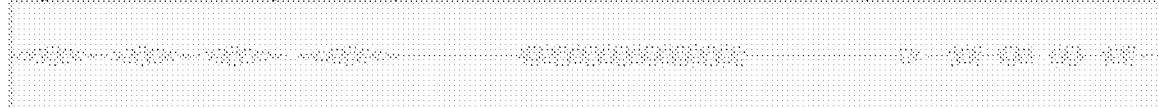
Fig. 5c Profile 2 (high amplitude threshold & preference)

Figure 6a: Minimum Stimulus Duration
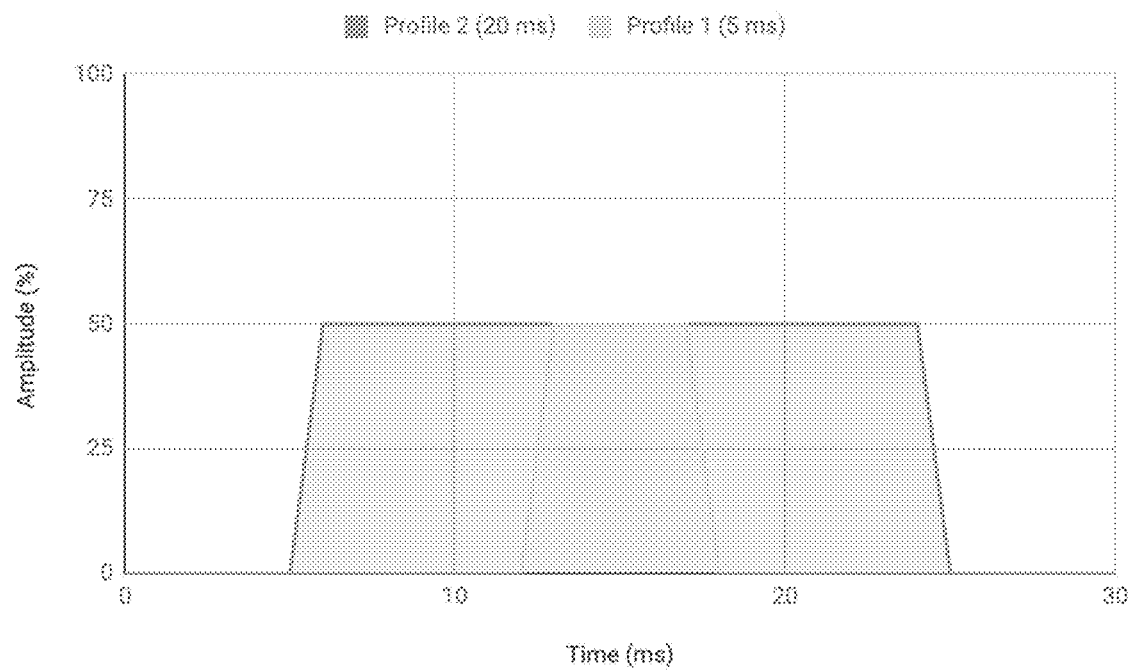
Fig. 6b Profile 1 (low duration detection threshold)
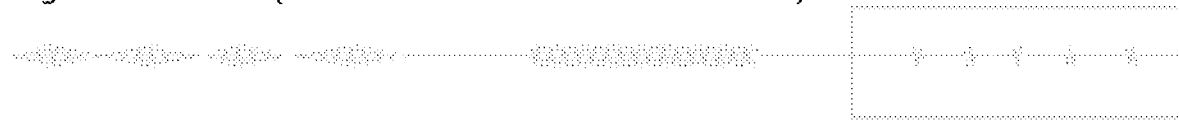
Fig. 6c Profile 2 (high duration detecting threshold)

Figure 7a: Gap detection
Fig. 7b Profile 1 (low threshold for detecting gaps)
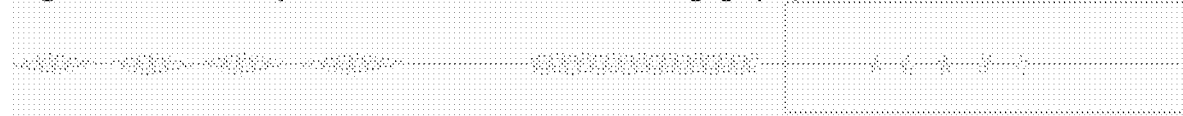
Fig. 7c Profile 2 (high threshold for detecting gaps)
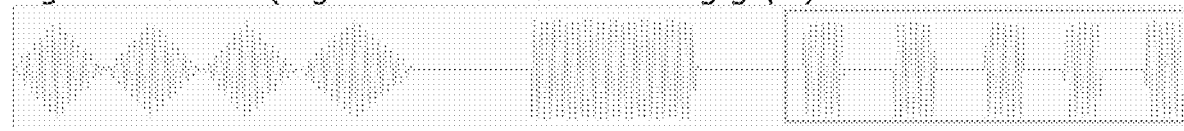

Fig. 8a: Accuracy and latency of identifying different frequencies and amplitudes
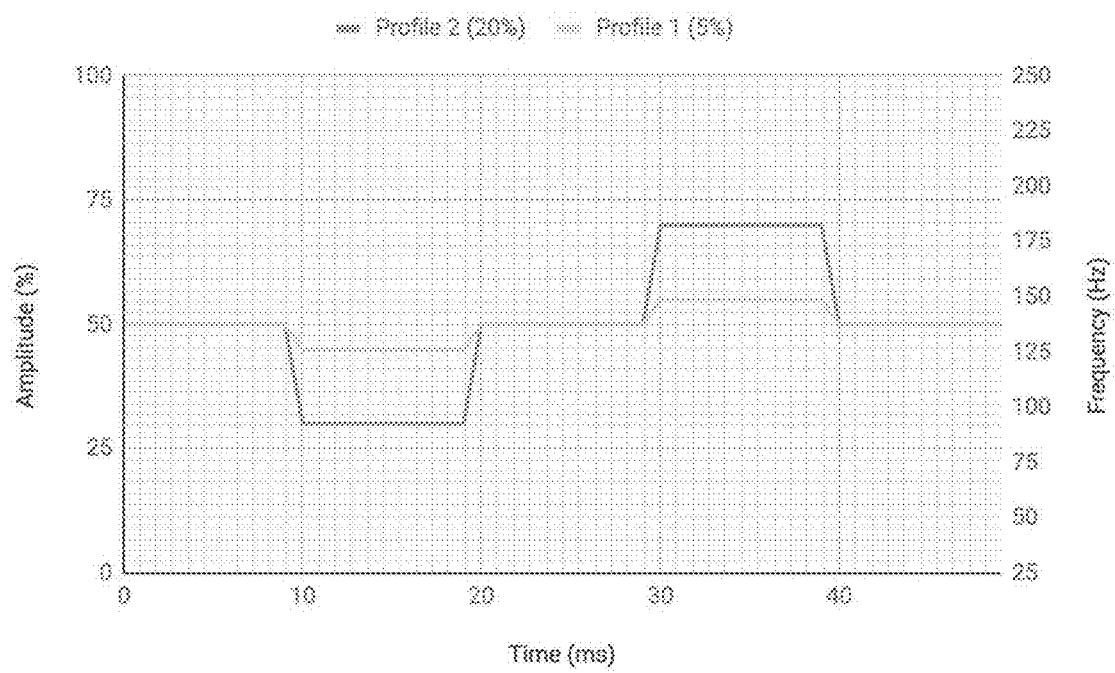
Fig. 8b Profile 1 (low threshold for discriminating frequencies)
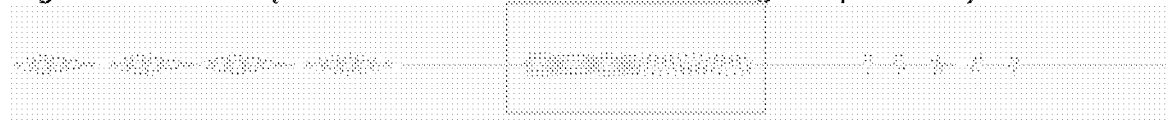
Fig. 8c Profile 2 (high threshold for discriminating frequencies)
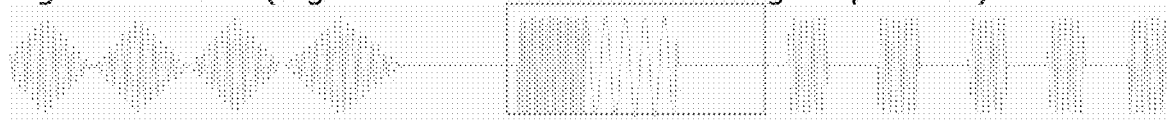

Fig. 9a: Accuracy and latency of identifying specific frequency or amplitude modulations
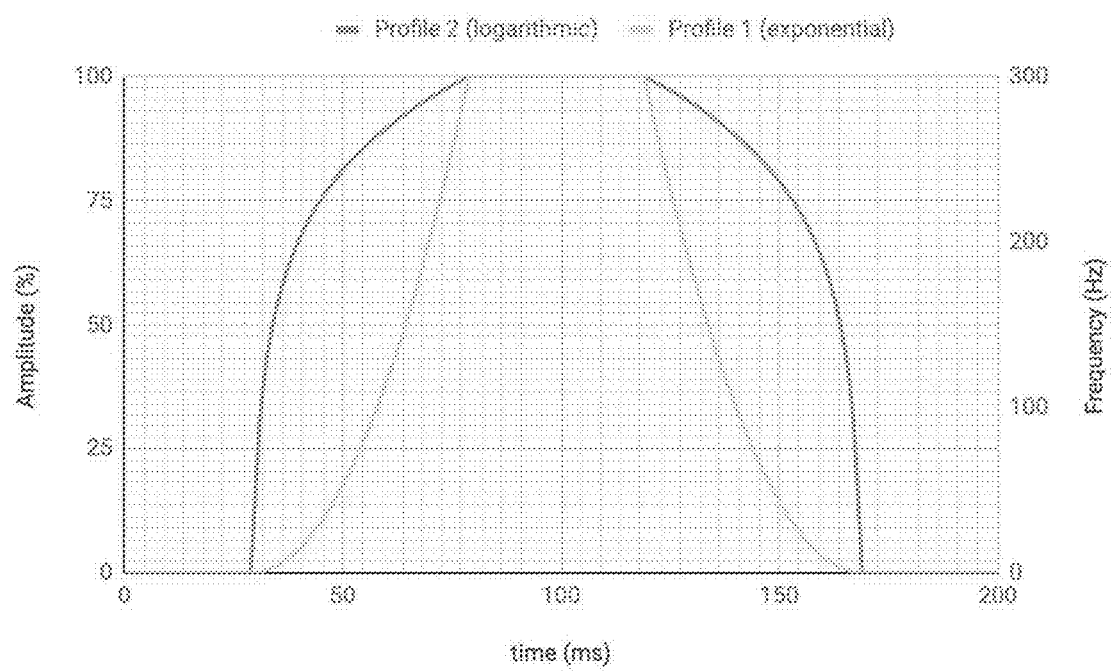
Fig. 9b Profile 1 (prefers logarithmic modulations)
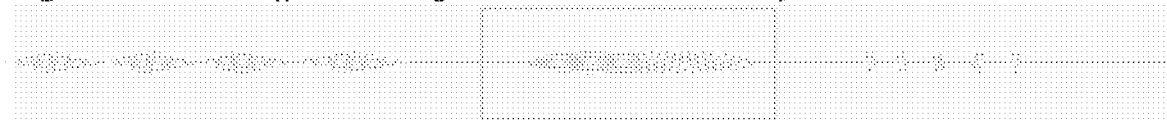
Fig. 9c Profile 2 (prefers exponential modulations)
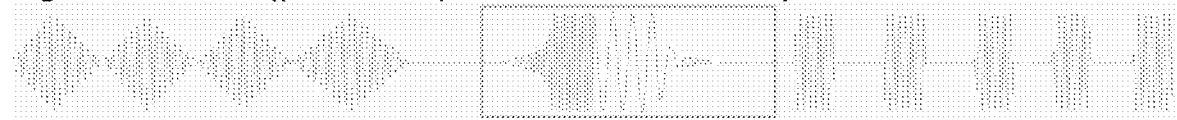

Fig. 10a: Accuracy and latency of identifying different waveform shapes
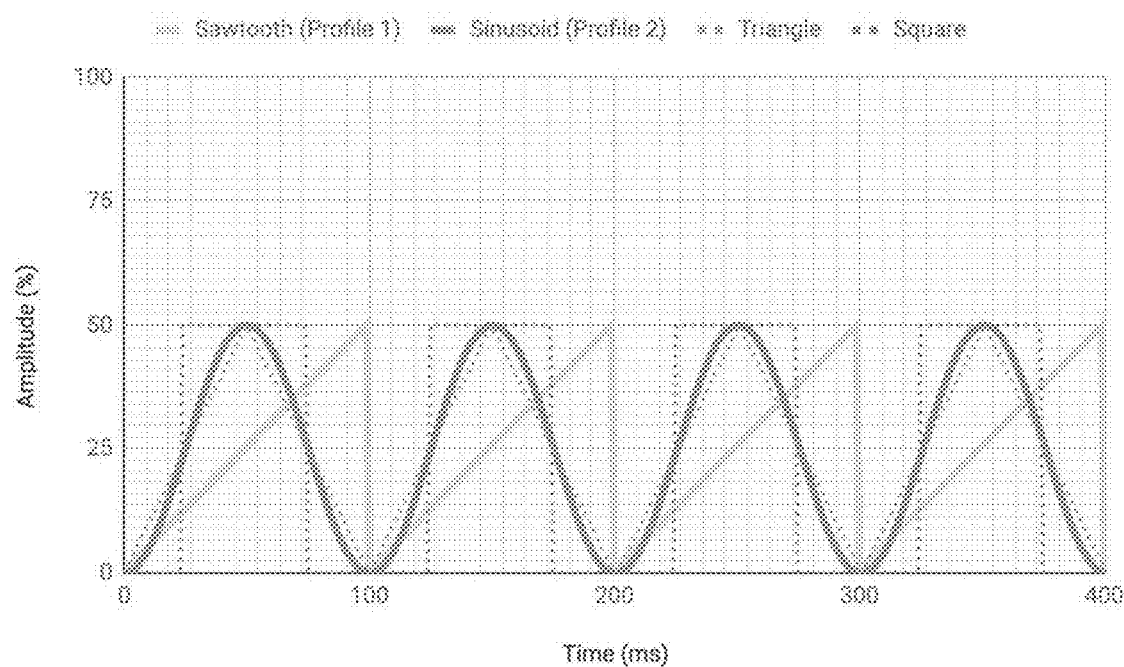
Fig. 10b Profile 1 (prefers sawtooth pattern)
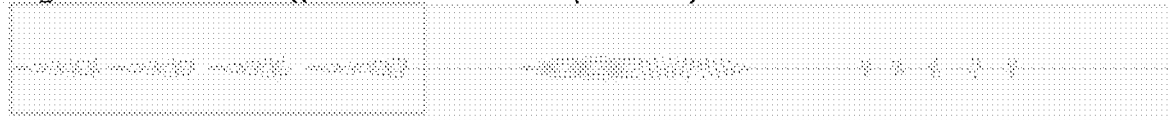
Fig. 10c Profile 2 (prefers sinusoidal pattern)
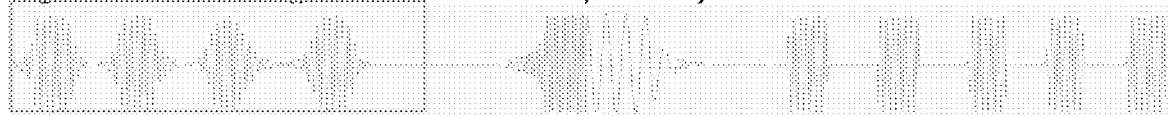

Resulting patterns after personalisation based on haptic profile
Fig. 11a original
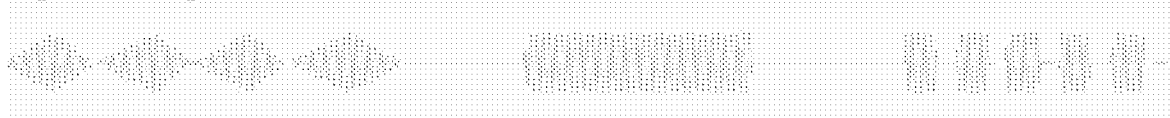
Fig. 11b Profile 1
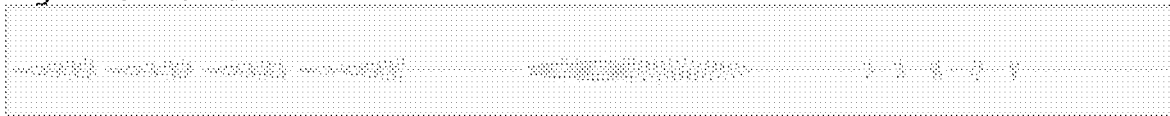
Fig. 11c Profile 2
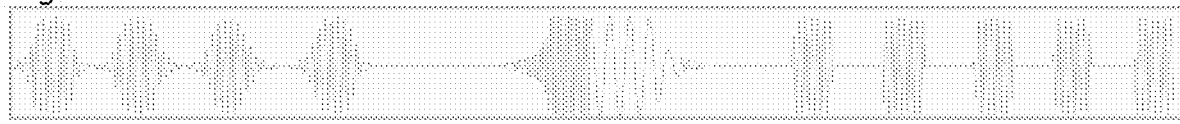

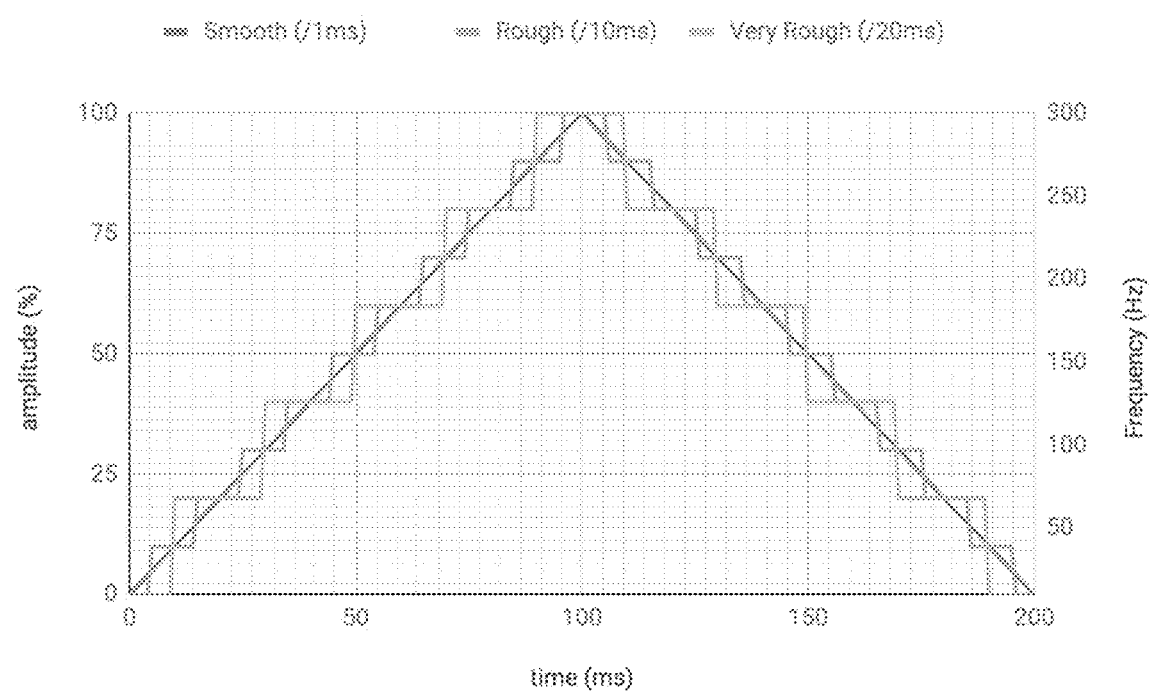
Figure 12: Accuracy and latency of identifying textures

Figure 13: Accuracy and latency of identifying specific clusters of rhythms
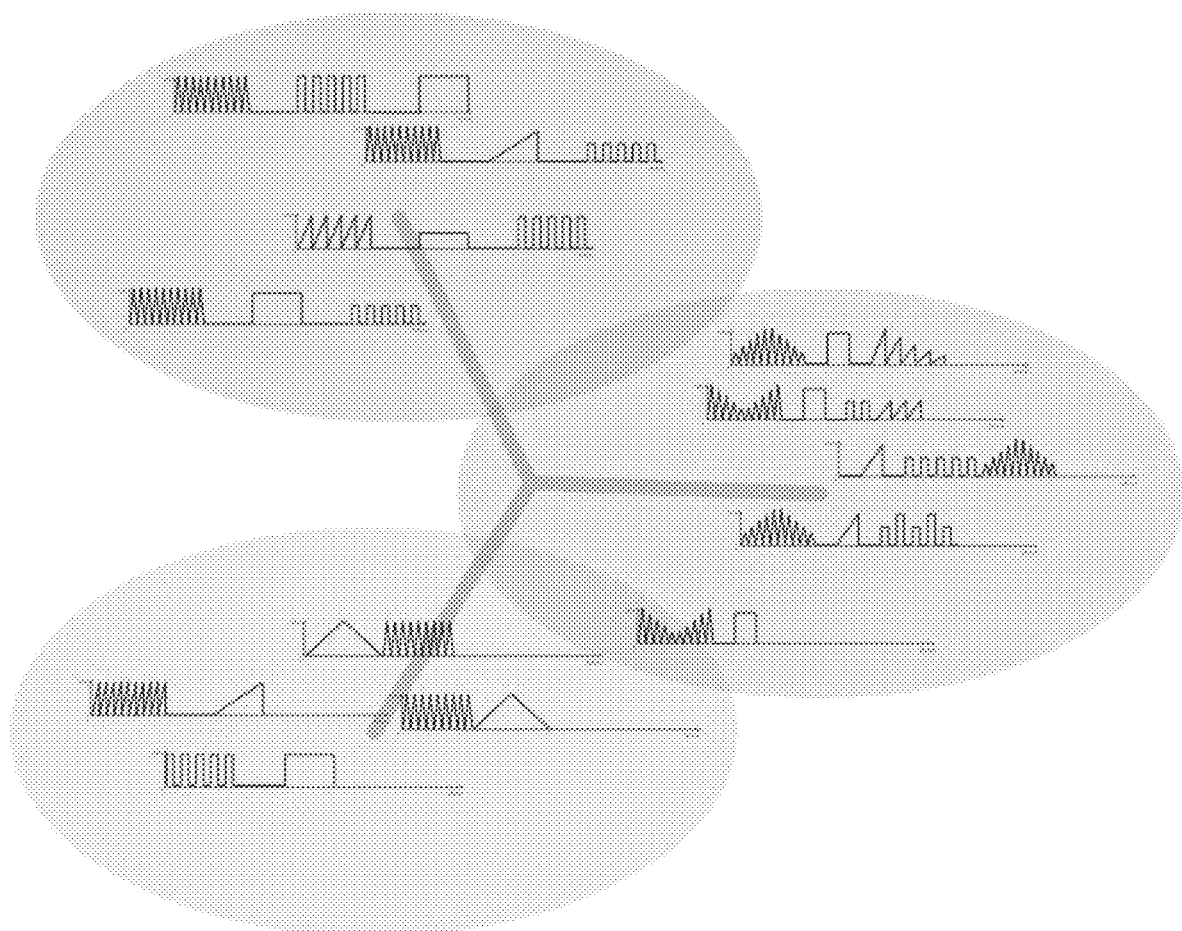

USER INTERFACE SYSTEM AND METHOD

CROSS-REFERENCE TO RELATED APPLICATION

This application claims priority to U.S. Patent Application No. 62/870,449 filed Jul. 3, 2019, GB Patent Application No. 1907385.7 filed May 24, 2019, and GB Patent Application No. 1915435.0 filed Oct. 24, 2019, the contents of which are incorporated by reference in their entirety as if set forth herein.

FIELD OF THE INVENTION

The present invention relates to a Human-Computer Interface, Human-Computer Interface system and method that is particularly applicable to personalisation of interfaces for users.

BACKGROUND TO THE INVENTION

Devices are becoming increasingly intelligent. As well as existing computing devices, cars, mobile phones and the like that already had user interfaces and computing capabilities, users are now being offered devices with integrated computers such as watches, coffee makers and door locks. Furthermore, new classes of devices such as smart speakers and other personal assistants are coming on to the market.

While capabilities of the various devices can vary significantly, the user interfaces offered are generally similar—they are typically based on buttons, touchscreen or voice-based inputs and provide visual and/or audible output.

As the number of devices carried by users and also those in the user's general environment increases, so too do the number of devices demanding attention. Information overload is a serious risk and a reason why the uptake in intelligent devices, particularly by those who are not used to the technology, has been met with reluctance.

STATEMENT OF INVENTION

According to an aspect of the present invention, there is provided a user interface system comprising a controller, a data repository and an I/O unit, the user interface system beings configured to cause, via the I/O unit, a user interface device of a user to provide a stimulus to the user, the user interface system is further configured to receive, from the user, data on the stimulus, wherein in response to the stimulus and the data provided by the user on the stimulus, the user interface system is arranged to record, in the data repository, stimulus recognized by the user, the controller being operable to determine an optimized set of stimuli to be used by the user interface device in dependence on the stimuli recognized by the user, the optimized set matching the number of stimuli provided by the user interface device, the controller being arranged to communicate with the user interface device and configure the user interface device to use the optimized set of stimuli for its functions.

The user interface system may be configured to guide the user through a series of stimuli applied by the user interface device via the I/O unit and determine a degree of recognition by the user for each stimulus.

The controller may be configured to record degree of recognition by the user for each stimulus in the data repository.

The controller may be operable to determine the optimized set of stimuli to be used by the user interface device in dependence on the recorded degree of recognition for each stimulus in the data repository, the optimized set matching the number of stimuli provided by the user interface device.

The system may further comprise a GUI accessible by the user and operable to assign stimuli to functions of the user interface device.

The system may further comprise a training system arranged to cause, via the I/O unit, the user interface device to provide training on a stimulus or a set of stimuli to the user.

The system may further comprise a machine learning system, the machine learning system being configured to guide the selection of stimuli and/or optimized stimuli for the user to be trained upon.

The system may further comprise an Appstore, the appstore includes apps and/or extensions that can be selectively installed onto a user device, the system being configured to determine assignment of stimuli in the user device for apps installed via the appstore.

The system may be configured to communicate with multiple user devices of a user and is configured to provide a substantially consistent stimulus for a particular function across the multiple user devices.

The system may further comprise a stimulus user profile in the data repository for each user, the stimulus user profile including data on the optimized sets of methods for stimulation for the user.

The stimuli may comprise one or more selected from a set including: vibration, electrical, stretching of the user's skin, pressure applied to the user's skin, sound and light.

The stimuli may be provided by an actuator that is controlled to provide a coded representation of a function, the representation being selected from one or more of a set including:

amplitude modulation, frequency modulation, spatiotemporal patterns across the multiple actuators.

The user interface system may be configured to guide the user through a series of stimuli applied by the user interface device via the I/O unit and determine a degree of reaction by the user for each stimulus, the controller being operable to determine the optimized set of stimuli to be used by the user interface device in dependence on the degree of reaction to the stimuli by the user.

The reaction may be a physical reaction, the system including one or more sensors configured to measure the user's physical reaction.

The reaction may be an emotional reaction, the user interface system being configured to receive an input from the user rating his or her emotional reaction to the stimulus, the user interface system being configured to determine the degree of reaction in dependence on the rating.

The user interface system may be configured to group stimuli in dependence on a user's reaction.

The user interface system may be configured to assign grouped stimuli to a common contact, contact type, role, demographic or other grouping relevant to the user.

According to another aspect of the present invention, there is provided a method of determining optimized stimuli using the system described above. The method may include applying one or more selected stimuli to a user device.

According to an aspect of the present invention, there is provided a user interface system comprising a controller, a data repository and an I/O unit. The user interface system is configured to cause, via the I/O unit, a user interface device of a user to provide a stimulus to the user. The user interface system is further configured to receive, from the user, data on the stimulus. In response to the stimulus and the data provided by the user on the stimulus, the user interface system is arranged to record, in the data repository, stimulus recognized by the user, the controller being operable to determine an optimized set of stimuli to be used by the user interface device in dependence on the stimuli recognized by the user, the optimized set matching the number of stimuli provided by the user interface device, the controller being arranged to communicate with the user interface device and configure the user interface device to use the optimized set of stimuli for its functions.

Embodiments seek to provide a framework to organize and coordinate the outputs of devices to suit abilities of users. Embodiments of the present invention seek to provide a system and method in which extensibility of a user interface can be managed in dependence on user capabilities. Preferred embodiments seek to provide a user interface system in which a user can be trained and/or tested to improve recognition of differing inputs and/or identify areas of granularity of user inputs that cannot be differentiated by a user. In this manner, user capabilities can be tested and monitored. Embodiments furthermore seek to provide a user interface that can be customized and improved in dependence on the testing and training to best suit the user's capabilities. While the aim is not to improve the user's capabilities, there may be situations where this is achieved. Embodiments seek to improve the stimulus paradigm to suit the (perhaps improving) capabilities of the user For example, a user interface may have a haptic output device for providing outputs to a user—the system can test and optionally train the user so as to determine and optionally improve the range of haptic stimuli the user can recognize from the device. Once the range of recognisable stimuli is identified, the system can associate outputs such as differing alert events with different haptic stimulus outputs by the device that have been determined to be distinguishable by the user. Optionally, the user may undergo training to improve his or her ability to recognize haptic stimuli so as to increase the number of stimuli that can be provided by the device. Optionally, the user interface device may be the output device for an extensible computing device (such as a mobile phone, smart watch etc on which new apps may be installed)—the system can optionally determine an optimized set of stimuli for the installed functions of the computing device in dependence on the user's capabilities. Where a threshold of detectable stimuli from the output device is reached, the system may be configured to suggest training and/or limitation of installed functions to ensure the user is able to successfully recognize the assigned stimuli.

Preferred embodiments seek to support the creation and maintenance of a haptic (or other stimulus type) user profile containing the optimized sets of methods for stimulation for that user. The profile can, in turn, be used to determine best configuration of user interfaces (apps etc) or devices as they are acquired by the user. The profile can also be used to determine when the stimuli used in an existing device could be changed or expanded upon.

Preferred embodiments also seek to provide a system in which multiple user interfaces and/or user interface devices are associated with a user profile such that common alerts/events across different devices have common stimuli associated with them and different alerts, events etc are associated with different stimuli. In this way, embodiments seek to optimize and coordinate the output of multiple devices and have a unified set of protocols for an individual user that is applied to all the devices of that user

BRIEF DESCRIPTION OF DRAWINGS

Embodiments of the present invention will now be described by way of example only with reference to the accompanying drawings in which:

FIGS. 4-13 are graphs and illustrations showing example steps in adapting a stimulus pattern by using data from two distinct haptic profiles.

DETAILED DESCRIPTION

Figure 1:
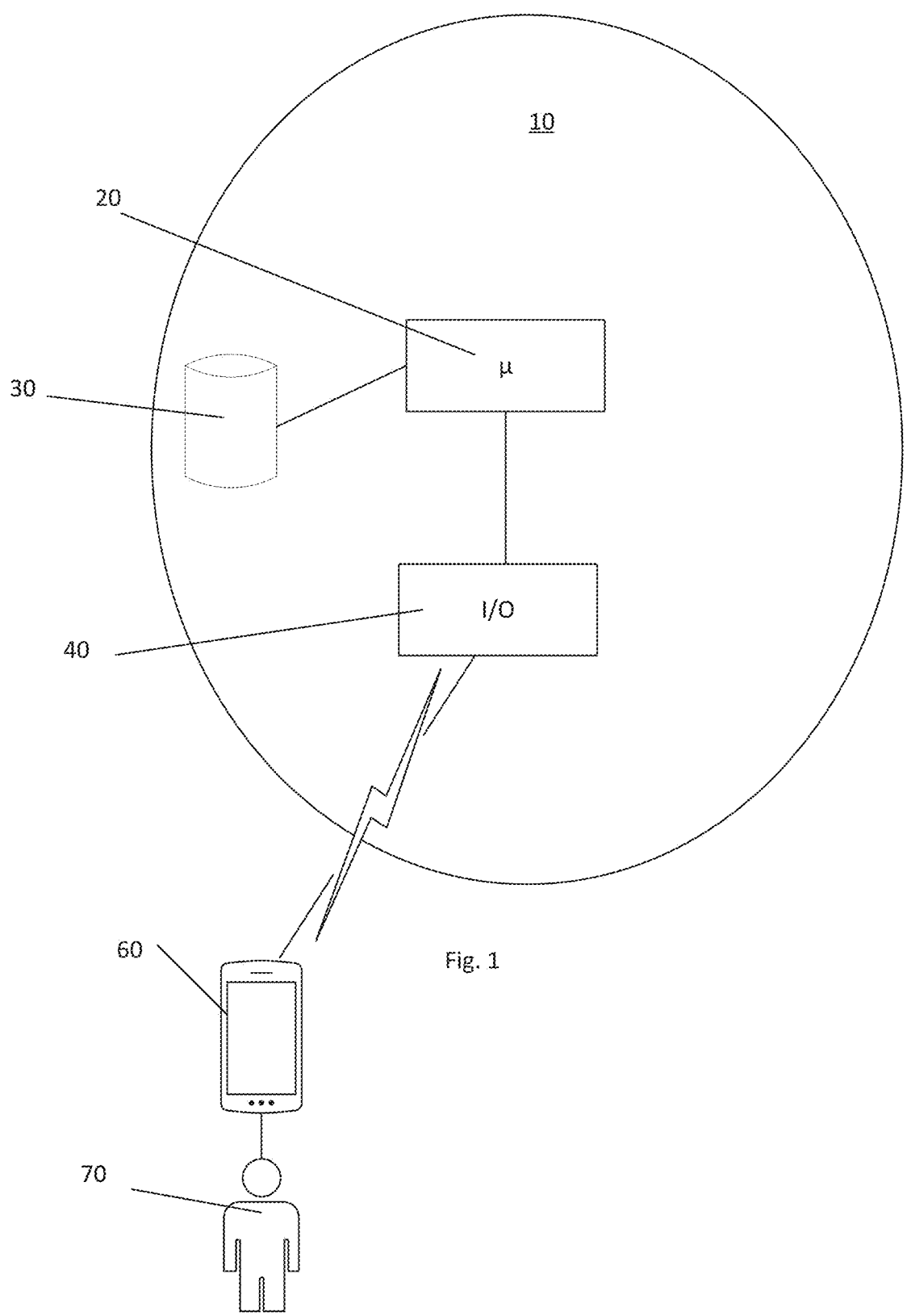
FIG. 1 is a schematic diagram of a user interface system according to an embodiment.

Embodiments of the present invention are particularly suited to managing and supporting user interfaces that interact via haptic stimuli. However, it will be appreciated that embodiments may support actuators that provide (by themselves or in combination) multiple stimuli types and/or stimuli other than haptic.

Vibrotactile stimulation, or haptics, has been widely used as a mechanism for notification. In recent years, uses have expanded considerably.

Examples of how haptics can be used are set out below.
1. As a complement to media
  a. Used to enhance the sensation of music by vibrating in tune.
  b. Used to improve video sequences and games by vibrating when events happen on-screen
2. As a force-feedback mechanism
  a. Used to give a feel of resistance in virtual remote instrumentation
  b. Used to give a feel of textures and shape in virtual design
3. As a simple feedback
  a. Used to give feedback on phone when using touchscreen
4. As a simple alert
  a. Used for vibration of a phone when a call or message is received
  b. Used to enhance ringtones.
5. As a method of communicating information
  a. Used to give navigational aid by vibrating on different areas of the body (e.g. left/right or front/back).
  b. Used to convey visual information as a sensory substitution tool for blindness
  c. Used to convey phonetic information by different spatial stimulation patterns across actuators in a spatial arrangement.

To-date, haptic stimulators have relied on simple binary activation using a single frequency. The spatial resolution of the human tactile sense, in most parts of the body is not very high. As a result, only simple actuators and haptic stimuli have been used.

Embodiments of the present invention enable more complex actuators to be employed, leading to more complex and varied stimulation patterns. They could, for example, use a combination of amplitude and frequency modulation and/or employ multiple spaced actuators to provide stimuli formed from defined spatiotemporal patterns across the multiple actuators. In this case, varying the spatial pattern of activation across multiple actuators in a specific spatial arrangement (e.g. a row of actuators on a bracelet or belt) can be used to encode information.

In addition to haptic stimulators, embodiments of the present invention may be used with other user interface devices that provide stimuli to users to indicate alerts, action, events and the like. Such stimulators may include:

1. Vibration: Actuator is a device that applies an oscillatory force at a range of frequencies and amplitudes (e.g. a Linear Resonant Actuator)

2. Electrical: Actuator is an electrode that applies an electrical current at a range of frequencies and amplitudes (e.g. a Bipolar Electrode)

3. Stretch: Actuator is a device that expands and contracts, thereby applying a stretching force (e.g. a Piezo patch)

4. Pressure: Actuator is a device that applies force in the form of pressure to the skin (e.g. a pressure cuff)

5. Sound: Actuator is a speaker or similar device that provides audible and/or verbal stimuli 6. Light: Actuator is a LED, LED array or other light emitter. Although stimuli would typically be simple flashing/coloured patterns, such actuators could also provide visual imagery such as still images or videos.

Although the following discussion focuses on haptic stimuli, it will be appreciated that others such as those above could also be used in addition or in alternative.

FIG. 1 is a schematic diagram of a user interface system according to an embodiment.

The user interface system 10 includes a controller 20, a data repository 30 and an I/O unit 50.

The user interface system 10 is configured to cause, via the I/O unit 50, a user interface device 60 of a user 70 to provide a stimulus to the user 70. The user interface system 10 is further configured to receive, from the user 70, data on the stimulus. In response to the stimulus and the data provided by the user 70 on the stimulus, the user interface system 10 is arranged to record, in the data repository 30, stimulus recognized by the user.

Preferably, under control of the controller 20, the user interface system 10 is configured to guide the user through a series of stimuli applied by the user interface device 60 via the I/O unit 50 and determine a degree of recognition for each stimulus.

Preferably, the controller 20 is configured to record degree of recognition by the user 70 for each stimulus in the data repository 30.

Preferably, the user interface device 60 is configurable, the controller 20 is operable to determine an optimized set of stimuli to be used by the user interface device 60 in dependence on the recorded degree of recognition for each stimulus in the data repository, the optimized set matching the number of stimuli provided by the user interface device 60. The controller is arranged to communicate with the user interface device 60 and configure the user interface device 60 to use the optimized set of stimuli for its functions. The user interface system 10 may include a GUI accessible by the user 60 to assign stimuli to particular functions of the user interface device 60. It will be appreciated that systems other than GUIs could also be used including verbal and gesture based interfaces.

Figure 2:
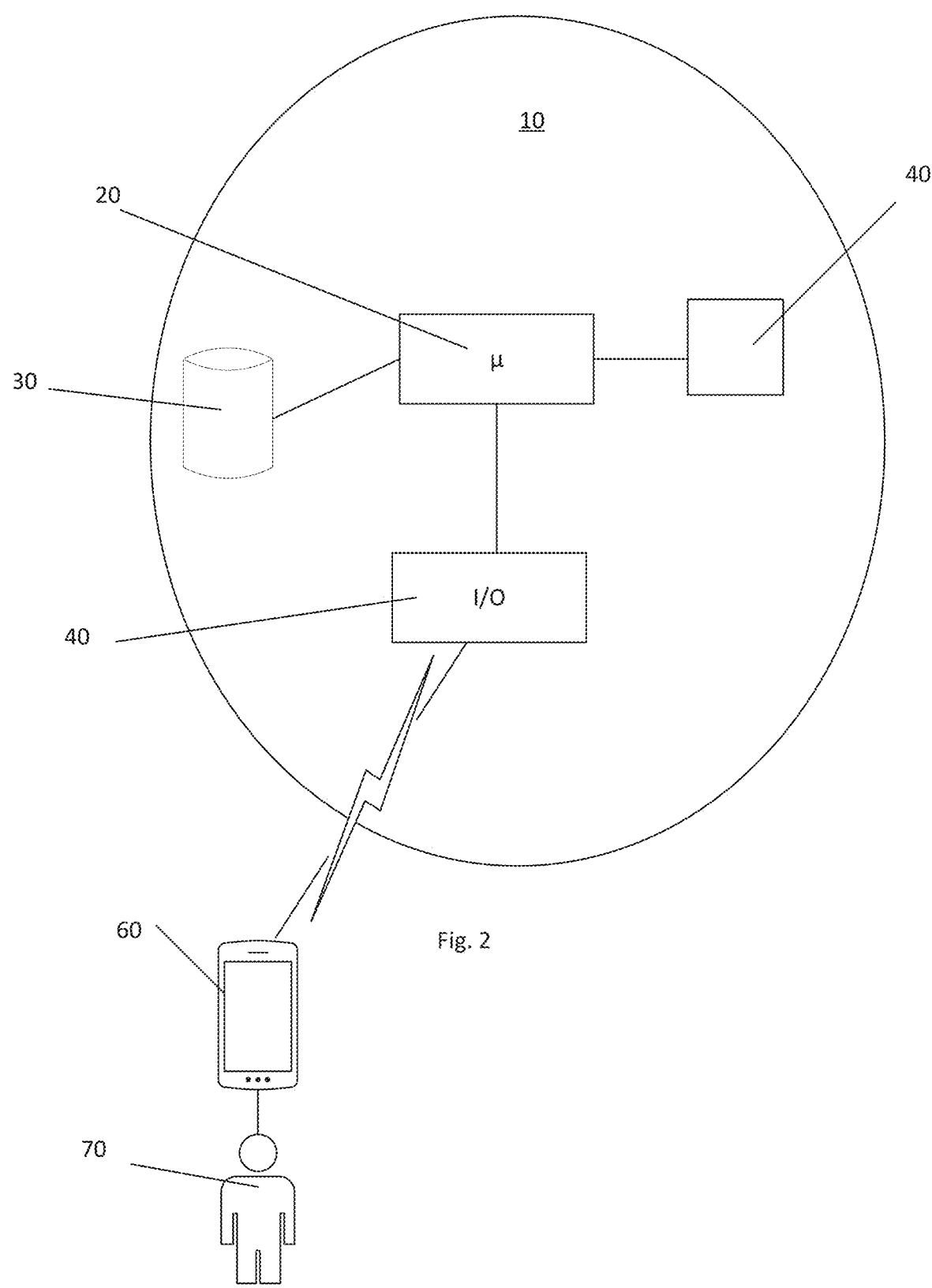
FIG. 2 is a schematic diagram of the user interface system of FIG. 1 highlighted selected preferred options.

FIG. 2 is a schematic diagram of the user interface system of FIG. 1 highlighted selected preferred options.

Preferably, the user interface system 10 is configured to invoke a training system 40, the training system 40 being arranged to cause, via the I/O unit 50, the user interface device 60 to provide training on a stimulus or a set of stimuli to the user 70. Training may, for example, include providing a number of different stimuli and guiding the user so as to highlight the sensation provided by the respective stimulus. Due to repeated stimuli, the user can be educated to recognize and differentiate different stimuli.

Preferably, the controller 20 and/or the training system 40 includes a machine learning system. The machine learning system may guide the selection of stimuli and/or optimized stimuli. It may also guide the selection of stimuli for the user to be trained upon (or those to be avoided as the user is not ready or able to differentiate).

Figure 3:
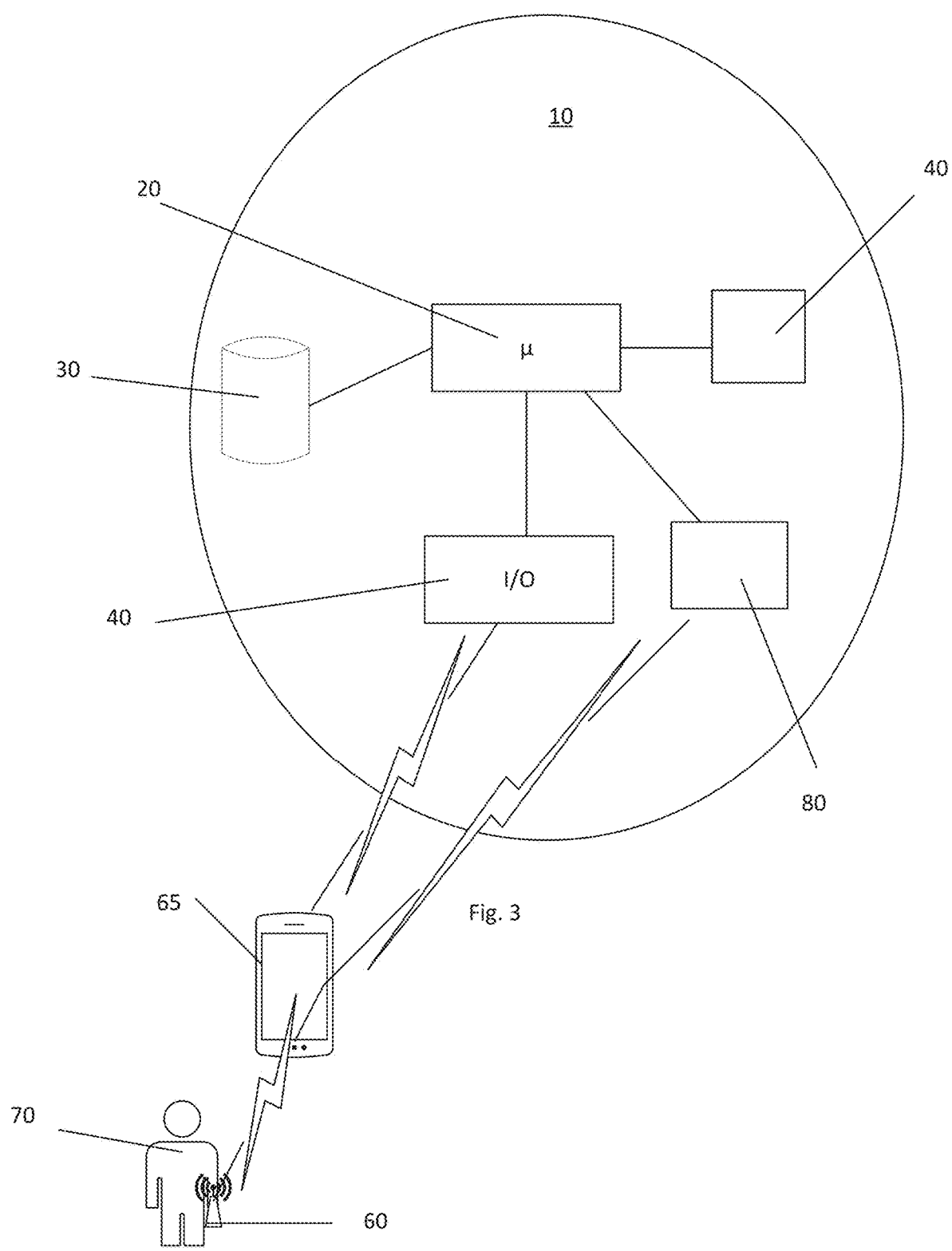
FIG. 3 is a schematic diagram illustrating a further embodiment.

FIG. 3 is a schematic diagram illustrating a further embodiment.

Preferably, the user interface system 10 includes an Appstore 80. The Appstore 80 includes apps and/or extensions that can be selectively installed onto a user device.

The user device may be the user interface device 60 or it may be a user device 65 that communicates with the user via the user interface device 60. For example, the user interface device 60 may be a smartwatch with a haptic stimulator. It will be appreciated that apps may be installable onto the smartwatch 60 or they may be installed onto a smartphone 65 linked to the smartwatch 60 via Bluetooth, Bluetooth Low Energy, ANT+ or similar technologies. In the latter case, the app could be installed on the smartphone 65 and provides stimulus to the user via the smartwatch 60.

The user interface system 10 may furthermore guide the user on combinations of apps that can be accommodated. For example, where two apps want to use the same stimulus, the user interface system 10 may suggest changing the stimulus of one or the other. Similarly, where the user seeks to install more apps that provide stimuli exceeding those the user interface device 60 can provide or exceeding the number the user has shown he or she can recognize, the user interface system 10 may provide a warning, block installations or suggest more training to extend the stimuli recognition of the user.

A particular advantage of embodiments of the present invention is that they focus on flexibility and extensibility. The type and capability of the user interface device and its stimulator can vary and as more complex devices and stimulators become available or different ways of stimulating a user become recognized, embodiments can accommodate these. The user interface system is distinct and separable from any specific user interface device hardware.

Communication with the user interface device and its stimulator will depend on the particular device but would typically be via Bluetooth, an API or similar. In the case of smartphones and the like, an app may be installed on the smartphone to act as a gateway to the smartphone hardware for the user interface system 10.

Embodiments seek to enable a single device (with one or more actuators) to provide pertinent haptic communication for multiple independent applications. Embodiments seek to achieve this by employing a unique combination of cognitive modelling with machine learning (to identify the stimuli the user can recognize) and complex temporal vibrotactile stimulation protocols (which can provide a granular and extensive vocabulary of stimuli for communicating with the user) to create a rich and complex language that is uniquely tailored and private to an individual user.

Preferred embodiments use structured stimulation patterns that do not rely on a spatial arrangement of actuators to be effective. To achieve this, combinations of distinct and varying rhythms with frequency and amplitude modulation are used to create rich structured stimulation patterns. The main challenge with this type of stimulation is that accuracy and precision are often variable between individuals but internally consistent within an individual. To solve this problem and create a language that is widely useable, a combination of modelling approaches and machine learning algorithms are used to personalize and adapt structured haptic stimulation to create a personalized and efficient haptic language system for transmitting information.

Embodiments seek to provide a system that provides ongoing interaction between learning of the user and training of the machine learning models that can be used to continuously optimize the stimuli available to all users and in particular to tune those used for particular users.

Preferably, there are four main aspects to the modelling, which are all interdependent and, preferably, occur simultaneously and some of which may optionally be repeated periodically or upon a change to the user interface device, apps installed etc:

Haptic profiling by developing a model of the optimized haptic stimulation for an individual user by using data from both explicit testing and training of the user alongside behavioural data from continued usage and learning.

Personalising haptic stimulation and learning process by selecting or creating new stimulation protocols that are optimized for easy learning using the current haptic profiling data.

Continuous optimisation of haptic stimulation and learning process through continued use by implicitly adapting and testing parameters that increase comprehension and/or efficiency of data transmission. Along with adapting learning process for new stimulation protocols based on effectiveness of previous learning.

Expanding language by assigning stimulation protocols to specific applications depending on application type, haptic profile, behavioural data and protocols already learned.

Haptic Profiling and Initial Personalisation

The creation of a model requires sufficient data about an individual's capabilities and preferences. In order to acquire this information, the user will initially go through an onboarding process aimed at testing aspects of communication protocols to determine the abilities and preferences of that individual. This means that the initial learning process is optimized and the stimulation protocols and language structure is personalized from the onset.

The main factors extracted for the haptic profile may include:

Detection threshold. The minimum amplitude of stimulation that is needed for stimulus to be detectable.
  Determines the baseline stimulation amplitude.
  Modulations will be further scaled based on this threshold.
Minimum Stimulus Duration. The shortest detectable stimulus duration
  Determines the minimum duration of a single stimulus.
  Other stimulus durations will be scaled accordingly.
Gap detection. The shortest detectable inter-stimulus interval
  Determines the minimum gap duration.
  Other gap durations will be scaled accordingly.
Accuracy and latency of identifying different frequencies and amplitudes. These measures allow for calculations of the ability to discriminate levels of either frequency or amplitude.
  Optimizes the frequency and/or amplitude level for steady stimulation.
  Determines the separation of distinct frequencies and/or amplitudes for modulation layers in steady stimulation.
Accuracy and latency of identifying specific frequency or amplitude modulations. These measures allow for calculations of preferences between using frequency or amplitude modulation in constructing patterns and gives a measure of the ability to discriminate between different gradients of modulation.
  Determines the relative contributions of frequency and amplitude modulation
  Optimizes the modulation gradient
  Determines the shape of the modulation (e.g. linear or logarithmic)
Accuracy and latency of identifying different waveform shapes. These measures reveal the abilities to distinguish different waveform shapes the frequencies at which these are distinguishable
  Determines the number of waveforms that will be employed
  Optimizes the frequency and amplitude ranges for each waveform.
Accuracy and latency of identifying textures. These measures reveal the abilities to distinguish between step sizes that simulate the degree of roughness and smoothness of a stimulus
  Determines the nature of step changes needed to differentiate two otherwise identical stimuli
Accuracy and latency of identifying specific sets of rhythms. These measures allow for testing the ability to distinguish rhythms of varying complexity, which gives a good measure of temporal precision and memory capacity.
  Determines the level of complexity of rhythms.
  Determines the number of rhythms that will be assigned for a user to learn.
Emotive ratings of rhythm prosody. These measures allow for clustering of rhythms depending on emotive rating of the prosody of the rhythm.
  Determines the contexts in which clusters of rhythms are employed.

Other factors that may be included in the haptic profile
Aside from the experimental data, the haptic profile may also contain other information that could impact on the choice of stimulus protocols and structure of the language. It is important to note that while this information might be used to inform parameter selection, the main purpose is to complement the experimental data from the testing phase.

Information about the background of the user
  Information about Native Language(s) could guide the choice of language structure—the structure of a person's native language will have an impact on the language structure that is the most intuitive to learn. e.g. whether the structure is phonemic or symbolic.
  Information about Second Language(s) could determine the initial complexity of the language—whether a person is monolingual, bilingual, or has acquired a second language later will have an impact on the learning of a new language even if it a different modality.
Behavioural data about a user
  Information about usage patterns and applications.
Data from other users
  To increase the amount of data available to train the model, data from the haptic profile of individual users is complemented by population data from users that are clustered along similar axes.

Continuous Optimisation

In order to optimize the experience, the stimulation parameters in the haptic profile will preferably be continually tweaked to optimize the efficiency of the stimulation. This may be done in several ways:

- Based on user feedback: If a user tells the device that a stimulus is not easily distinguished or detected, an adaptation phase is started where the stimulus parameters are changed to make the stimulus more easily identifiable or easier to detect.
- Based on explicit testing: Data from ongoing learning sessions is used to both optimize new stimulation protocols and adapt the learning process while also optimising existing protocols.
- Based on implicit testing: The algorithm can perform subtle tests to obtain data that can be used to gradually optimize the efficiency of the communication, e.g. by shortening sequences.

Expanding Language by Assigning Stimulation Protocols to New Applications and/or Functionalities This aspect involves assigning stimulation protocols (or sets thereof) to applications through an app-store. This may involve the addition of new applications or an expansion of the functionality of an existing application.

There are several aspects to this:
- Suggesting applications or functionalities best suited to a user. Within this is also the ability to select which or how many applications or functionalities a user has access to based on having sufficient recognition proficiency.
- Selecting stimulation protocols to assign based on their relevance and/or intuitiveness of communicating the information relevant to the application, e.g.:
  - An application needing information about changes in speed might be better suited to a stimulation pattern that has options of changes in direction of frequency modulation
  - An application conveying distance information might be better suited for a stimulation pattern that has varying levels of amplitude.
- Selecting stimulation protocols that are distinct and distinguishable from other protocols that already have meanings associated.
- Adapting existing protocols to increase the dissimilarity score between stimulation protocols in order to increase capacity for new protocols.

Expanding Usage by Applying Language Across Multiple Devices

The private and personalized nature of the language protocols makes the user interface system uniquely portable, which means it can be used across multiple haptic devices while maintaining consistent and effective communication. i.e. once a user has learned the association between a stimulation protocol and a meaning on one device, this same protocol could be employed to transmit the same information on multiple devices.

It will be appreciated that the data repository may take various forms including a central or distributed file store, database (such as SQL or other relational or non-relational database types). It may be implemented using storage devices such as hard disks, random access memories, solid state disks or any other forms of storage media. It will also be appreciated that the controller discussed herein may represent a single processor or a collection of processors acting in a synchronized, semi-synchronized or asynchronous manner. For example, a master server system may maintain the user interface system and be responsible for interaction between fully autonomous agents whilst a user's local PC or other computing device may be the "controller" or I/O device responsible for communicating with the user interface device. Alternatively, a central system may be responsible for processing decisions. The machine learning system may take many forms including a trained neural network, Support Vector Machines, Random Forest, K-Means, Matrix Factorisation or some combination thereof.

The method and system enables stimuli to be harmonized across devices for a user and in the case where different stimulators are used, the system and method could approximate a stimulus pattern so that it is as close as possible depending on the capabilities of the different stimulators and recognized to be the same by the user across those different devices.

The above discussion sets out principles and details of the underlying system and method that can be applied to different forms of user interface that may use differing (or multiple) types of stimuli and/or stimulators. It will furthermore be appreciated that it also opens up opportunities for more complex stimulators to be developed without the need to identify exactly which stimulus patterns/types they will use as these can be tailored to the user during deployment or later.

An example of this approach is discussed below with reference to FIGS. 4-13. In this arrangement, a haptic stimulator is used that is controllable such that one or more of frequency, amplitude, duration, signal gaps, waveform shape or other attributes can be adjusted to suit the user. The Figures illustrate:

FIG. 4—An original waveform to be applied as a stimulus by a stimulator. The method/system is applied to modify this to suit a user as shown in the following figures.

FIG. 5a—testing results against first and second profiles for amplitude detection;

FIG. 5b—an example profile used for testing for users able to detect and preferring a low amplitude stimulus;

FIG. 5c—an example profile used for testing users able to detect and preferring a high amplitude stimulus;

FIG. 6a—testing results against first and second profiles for stimulus duration detection;

FIG. 6b—an example profile used for users able to detect and preferring a low duration stimulus;

FIG. 6c—an example profile used for users able to detect and preferring a high duration stimulus;

FIG. 7a—testing results against first and second profiles for gap detection;

FIG. 7b—an example profile used for users able to detect and preferring a low gap duration stimulus;

FIG. 7c—an example profile used for users able to detect and preferring a high gap duration stimulus;

FIG. 8a—testing results against first and second profiles for frequency and amplitude detection;

FIG. 8b—an example profile used for users able to detect and preferring a low frequency stimulus;

FIG. 8c—an example profile used for users able to detect and preferring a high frequency stimulus;

FIG. 9a—testing results against first and second profiles for specific frequency or amplitude modulation type detection;

FIG. 9b—an example profile used for users able to detect and preferring a logarithmically modulated stimulus;

FIG. 9c—an example profile used for users able to detect and preferring an exponentially modulated stimulus;

FIG. 10a—testing results against first and second profiles for specific waveform type detection;

FIG. 10b—an example profile used for users able to detect and preferring a sawtooth pattern stimulus;

FIG. 10c—an example profile used for users able to detect and preferring a sinusoidal pattern stimulus;

FIG. 11a—the original waveform prior to customisation for a user;

FIG. 11b—the profile produced for a first user following testing to identify detectable and preferred stimulus types;

FIG. 11c—the profile produced for a second user following testing to identify detectable and preferred stimulus types;

FIG. 12—results showing modification of step size of a modulation to modify the emotional perception of a stimulus that is otherwise unchanged. For example, increasing the step size from 1 to 10 results in a stimulus feeling rough instead of smooth. Further increasing step size to 20 makes it feel unpleasant instead of pleasant.

FIG. 13 is a schematic diagram showing clustering users on the basis of the similarity of their haptic profile. Stimulus patterns are also clustered based on their similarity and emotional context. This is used by the system to match stimulus patterns to both appropriate haptic profiles and to appropriate applications.

The system may be configured to automatically or semi-automatically assign stimuli to functions/applications of a device. The content of the stimulus (such as haptic) profile and the type of content/function may be matched to provide either an automatic assignment of or a narrowed down selection of "appropriate" stimuli and not the full complement of stimuli in the profile.

In addition to physical reactions to stimuli, emotional reaction may also be tested/recorded. For example, an emotional valence value may be assessed either by monitoring reactions, directly asking users about testing and/or using prediction based on other data from the user, e.g. performance/perception data from various psychological tests. Physiological measures e.g. heart rate, temperature and movement may also be used to assess the emotional response to a stimulus.

Stimuli may be grouped, either by emotion (happy, enjoyable, scary . . . ), activity type (pleasure, business, family), for contacts (a group for spouse etc) or in other ways such that a stimulus from that group is assigned to alerts or actions from the device associated with that grouping.

Preferably, stimuli are classified according to what effect they will have on you, whether it be emotional associations, e.g. long duration pulses, low frequency and slow modulations for calming stimuli or short duration pulses in a higher frequency-band with fast modulations. for some notifications/alerts.

One possible arrangement may include the steps:

1. The system provides a set of optimized stimuli for a user based on the haptic profile.

2. As part of the haptic profile is data about emotional valence of stimuli based on user ratings (e.g. exciting, calming, happy, confusing, etc).

3. As part of the development of an application, an emotion or desired affect can assigned to a function.

4. The emotional valence of a stimuli (for a specific user) is used to either assign an appropriate stimulus to a given function or select which stimuli are suggested for user to choose from.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims and equivalents thereof.

The invention claimed is:

1. A user interface system comprising a controller, a data repository, one or more sensors, and an I/O unit, wherein the controller comprises a processor and a memory, the user interface system causes, via the I/O unit, a user interface device of a user to output a stimulus to the user, the user interface system is further configured to receive, from the user, data on the stimulus, wherein the stimuli comprises one or more selected from a set including: vibration, electrical, stretching of the user's skin, pressure applied to the user's skin, sound and light, wherein in response to the stimulus and the data provided by the user on the stimulus, the user interface system records, in the data repository, stimulus recognized by the user, the controller determining an optimized set of stimuli to be used by the user interface device in dependence on the stimulus recognized by the user, the optimized set of stimuli matching a number of stimuli provided by the user interface device for communicating with the user on its functions;

the controller communicating with the user interface device and configuring the user interface device to use the optimized set of stimuli for outputting communications to the user on its functions;

wherein the user interface system is configured to guide the user through a series of stimuli applied by the user interface device via the I/O unit and determine a degree of recognition for the stimulus recognized by the user for each stimulus, the controller determining the optimized set of stimuli to be used by the user interface device in dependence on the degree of recognition for the stimulus recognized to the stimuli by the user;

wherein in the event that the stimulus recognized by the user is a physical reaction, the one or more sensors are configured to receive or measure the physical reaction of the user; and wherein in the event that the stimulus recognized by the user is an emotional reaction, the user interface system is configured to receive an input from the user rating his or her emotional reaction to the stimulus, the user interface system being configured to determine the degree of recognition for the stimulus recognized by the user in dependence on the rating.

2. The system of claim 1, wherein the controller is configured to record the degree of recognition for the stimulus recognized by the user for each stimulus in the data repository.

3. The system of claim 1, wherein the controller determines the optimized set of stimuli to be used by the user interface device in dependence on the recorded degree of recognition for the stimulus recognized for each stimulus in the data repository, the optimized set matching the number of stimuli provided by the user interface device.

4. The system of claim 1, further comprising a GUI accessible by the user and configured to assign stimuli to functions of the user interface device.

5. The system of claim 1, further comprising a training system configured to cause, via the I/O unit, the user interface device to provide training on the stimulus or the set of stimuli to the user.

6. The system of claim 5, further comprising a machine learning system, the machine learning system being configured to guide the selection of stimuli and/or optimized stimuli for the user to be trained upon.

7. The system of claim 1, further comprising an appstore, the appstore includes apps and/or extensions that can be selectively installed onto a user device, the system being configured to determine assignment of stimuli in the user device for apps installed via the appstore.

8. The system of claim 1, wherein the system is configured to communicate with multiple user devices of the user and is configured to provide a substantially consistent stimulus for a particular function across the multiple user devices.

9. The system of claim 1, further comprising a stimulus user profile in the data repository for each user, the stimulus user profile including data on the optimized sets of methods for stimulation for the user.

10. The system of claim 1, wherein the optimized set of stimuli are provided by an actuator that is controlled to provide a coded representation of a function, the representation being selected from one or more of a set including: amplitude modulation, frequency modulation, spatiotemporal patterns across multiple actuators.

11. The system of claim 1, wherein the user interface system is configured to group stimuli in dependence on a user's reaction.

12. The system of claim 1, wherein the user interface system is configured to assign grouped stimuli to a common contact, contact type, role, demographic or other grouping relevant to the user.

13. A method for configuring a user interface, on a user interface device of a user, to provide a stimulus to the user, comprising:
  causing a stimulus to be output by an I/O device to the user, wherein the stimuli comprises one or more selected from a set including: vibration, electrical, stretching of the user's skin, pressure applied to the user's skin, sound and light, wherein causing the stimulus comprises guiding the user through a series of stimuli applied by the user interface device via the I/O unit;
  receiving, from the user, data on the stimulus, recording, in a data repository, stimuli recognized by the user;
  determine a degree of recognition for the stimuli recognized by the user for each stimulus from the data on the stimulus;
  determining an optimized set of stimuli to be used by the user interface device in dependence on the degree of recognition for the stimuli recognized by the user;
  communicating with the user interface device and configuring the user interface to use the optimized set of stimuli for outputting communications to the user on its functions;
  wherein in the event that the stimulus recognized by the user is a physical reaction, one or more sensors of the user interface device are configured to receive or measure the physical reaction of the user; and
  wherein in the event that the stimulus recognized by the user is an emotional reaction, the user interface device is configured to receive an input from the user rating his or her emotional reaction to the stimulus, the user interface device being configured to determine the degree of recognition for the stimulus recognized by the user in dependence on the rating.

\* \* \* \* \*